United States Patent
Amash et al.

(10) Patent No.: US 11,040,432 B2
(45) Date of Patent: Jun. 22, 2021

(54) TOOL MANUFACTURING METHOD

(71) Applicant: Tekton, Inc., Grand Rapids, MI (US)

(72) Inventors: John A. Amash, Grand Rapids, MI (US); Codie A. Bhuyan, Grand Rapids, MI (US); Ethan D. Fassezke, Grand Rapids, MI (US); Benjamin E. Harrison, Caledonia, MI (US); Devin L. Henige, Grand Rapids, MI (US); Laura R. Murphy, Plymouth, MI (US)

(73) Assignee: Tekton, Inc., Grand Rapids, MI (US)

( * ) Notice: Subject to any disclaimer, the term of this patent is extended or adjusted under 35 U.S.C. 154(b) by 0 days.

(21) Appl. No.: 16/164,980

(22) Filed: Oct. 19, 2018

(65) Prior Publication Data

US 2020/0122303 A1     Apr. 23, 2020

(51) Int. Cl.
| | |
|---|---|
| *B23P 15/00* | (2006.01) |
| *B25B 13/08* | (2006.01) |
| *B25B 23/16* | (2006.01) |
| *B23K 26/08* | (2014.01) |

(Continued)

(52) U.S. Cl.
CPC .......... *B25B 13/08* (2013.01); *B23K 26/0876* (2013.01); *B23P 15/00* (2013.01); *B25B 23/16* (2013.01); *B23K 2101/20* (2018.08); *B23K 2103/04* (2018.08)

(58) Field of Classification Search
CPC ......... B25B 13/08; B25B 23/16; B23P 15/00; B23K 26/0876; B23K 2103/04; B23K 2101/20
See application file for complete search history.

(56) References Cited

U.S. PATENT DOCUMENTS

| | | | | |
|---|---|---|---|---|
| 6,899,600 | B1 * | 5/2005 | Hsien | B21K 5/16 451/32 |
| 9,463,503 | B2 * | 10/2016 | Chen | B21K 5/16 |

(Continued)

OTHER PUBLICATIONS

Stress-and deformation analysis of a spanner, Aalborg University (Year: 2009).*

(Continued)

*Primary Examiner* — Stephen Choi
(74) *Attorney, Agent, or Firm* — Warner Norcross + Judd LLP

(57) ABSTRACT

A method for manufacturing hand tools, such as wrenches. The method generally includes the steps of providing a flat stock, cutting the flat stock into the desired two-dimension blank using a laser, and three-dimensionally machining the laser-cut 2D blank into the desired three-dimensional workpiece. The tool may undergo a heating treatment process and a surface treatment process. In the context of a wrench, the blank may be laser cut with a laser beam oriented to cut generally perpendicularly to the plane of the flat stock. After laser cutting, the handle and interface region between the handle and jaw(s) are machined to provide the desired three-dimensional shape. For example, the three-dimensional shape may be selected to provide a comfortable grip even when applying a high level of force. The wrench jaw may have an optimized geometry calculated so that there is no excess material or "over-designed" regions of the jaw. The wrench jaw has internal corners with optimized radii.

3 Claims, 5 Drawing Sheets

(51) Int. Cl.
*B23K 103/04* (2006.01)
*B23K 101/20* (2006.01)

(56) References Cited

U.S. PATENT DOCUMENTS

| | | | | |
|---|---|---|---|---|
| 2009/0165601 | A1* | 7/2009 | Bauman | B25B 13/04 |
| | | | | 81/119 |
| 2013/0098213 | A1* | 4/2013 | Lindblom, Jr. | B25G 3/26 |
| | | | | 81/177.85 |
| 2018/0056488 | A1* | 3/2018 | Dein | B25B 13/462 |
| 2019/0134787 | A1* | 5/2019 | Milligan | B25B 13/08 |

OTHER PUBLICATIONS

"K-Line Industries, Inc.—Fan Clutch Pulley Span Wrench" at least as early as Oct. 18, 2018.
Park Tool Headset Wrench, downloaded from https://www.parktool.com/product/headset-wrench-hcw-15, pp. 1-2, on Oct. 26, 2018, publicly available prior to Oct. 19, 2018.
Pedro's 32mm Headset Wrench, downloaded from https://pedros.com/products/tools/general-tool/32mm-headset-wrench/, p. 1, on Oct. 26, 2018, publicly available prior to Oct. 19, 2018.
PowerDyne Skate Tools 11/16 inch Deluxe Slim Wrench, downloaded from https://www.roller.riedellskates.com/catalog/tools-and-accessories/skate-tools/122371, pp. 1-2, on Oct. 26, 2018, publicly available prior to Oct. 19, 2018.

* cited by examiner

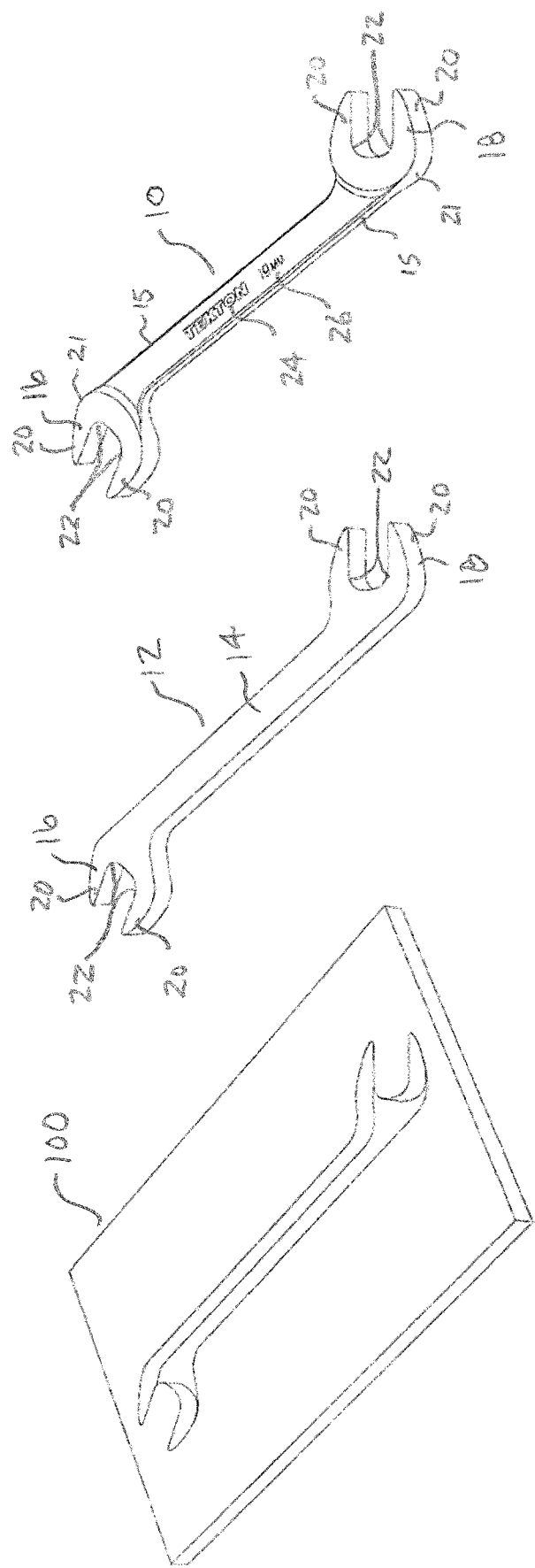

TOOL MANUFACTURING METHOD

BACKGROUND OF THE INVENTION

The present invention relates to tools, such as wrenches, and more particularly to methods for manufacturing tools.

It is a long-held and well-accepted belief that certain hand tools must be made using a forging process. For example, it is universally believed that wrenches of adequate function and strength must be manufactured through forging. Conventional wisdom is that forging is required to form a strong, high quality, general purpose wrench, such as a mechanic might use day to day. This belief has long been held not only by users of wrenches, but also by manufacturers of wrenches and, despite advancements in manufacturing technologies, this belief continues to be held to this day.

Forging can be done using a forging press or forging hammer. FIG. 1 shows a conventional forged combination wrench manufactured in accordance with the prior art. The forged wrench of FIG. 1 is typically manufactured from a bar stock, such as the cylindrical bar stock of FIG. 2. The bar stock is hammered into the desired shape. The press or hammer requires expensive tools and dies which are unique to a single part. Much of the reason that wrenches are forged is due to conventional thinking and practices. Hand tools have been forged for thousands of years. Forging is also often thought to create a tougher part that is stronger and/or more ductile due to grain flow during deformation of the part. It can sometimes achieve a near finished shape from a single process. A forging process can be economical at very high volumes, when the cost of tooling is offset. A forged wrench will generally require secondary machining operations or broaching to achieve proper openings and precise geometry. To illustrate, most wrench openings are cut to precise tolerances using a broaching machine. Like forging, broaching requires expensive custom tooling for each size desired.

Although forging and broaching can be economical processes at very high volumes, there is a long-felt and unmet need for an alternative process that can achieve similar or higher strength, durability, and functionality at a competitive cost, without high initial investment costs for tooling, and while maintaining flexibility to iterate designs. At lower volumes, forge and broach tooling costs can take many years or even decades to offset.

Forging suffers from other disadvantages. For example, there are meaningful practical limitations on the shapes that can be formed using conventional forging processes. For the case of wrenches and other hand tools, the metal generally starts as a straight, cylindrical billet. Shapes created in a forging process are limited to how far the mold can stretch or smash the metal. For example, the capital letter "T" would be very difficult to forge because it would require the straight billet to be stretched dramatically at one end perpendicular from its axis. When laser cut from a plate of steel, however, a capital "T" would be very simple to form. This difference is relevant to wrenches with forms that deviate from a straight handle axis. For example, some wrenches (including a style called "angle wrenches") can work best with large angular and locational jaw offsets relative to the handle when compared to other common wrenches (such as combination wrenches). This shape would require the steel billet material to stretch more. This increased stretch could require higher forge temperatures, higher press forces, or multi-stage molds. These in turn could increase tool wear or even make the geometry impossible to reasonably form. While there are options to bend the steel before or after forging (for example, if you were to forge an "S" shape, you could first bend the billet in two locations to form a backward "Z" shape; the "Z" billet would then be forged to form an "S"), these options still do not easily form shapes like the letter "T"

SUMMARY OF THE INVENTION

The present invention provides a method for manufacturing hand tools. It is particularly well-suited for manufacturing wrenches and, more particularly, for angle-head wrenches. The method generally includes the steps of providing a flat stock, such as a sheet stock or a plate stock, cutting the flat stock into the desired two-dimensional blank using a laser, and three-dimensional machining the laser-cut blank into the desired three-dimensional form. The steps of machining and laser-cutting may be implemented in any order. Following the final forming operation, the tool may undergo surface treatment and heating treatment steps.

In one embodiment, the blank is laser cut with a laser beam oriented to cut generally perpendicularly to the plane of the flat stock to form a wrench having at least one jaw extending from one end of a handle. After laser cutting, the handle and interface region between the handle and jaw are machined to provide the desired three-dimensional shape. For example, the three-dimensional shape may be selected to provide a comfortable grip even when applying a high level of force. As another example, the handle may be machined to round the corners and to provide a generally oval cross-sectional shape, which not only provides comfort, but also gives the wrench a conventional aesthetic appearance.

In one embodiment, the workpiece may be bent, for example, to vary the angle of the jaw from the handle.

In one embodiment, the flatstock may be manufactured by providing a block of steel and rolling the steel into a sheet or plate using a repetitive rolling process involving a series of sequential rolling operations.

In one embodiment, the three-dimensional workpiece is subjected to any desired surface treatment steps. For example, the surfaces of the three-dimensional workpiece may be deburred/finished using conventional finishing methods such as, but not limited to, polishing, buffing, vibration polishing, electropolishing, shot blasting or shot peening.

In one embodiment, the three-dimensional workpiece is heat treated by a quench and temper process.

In one embodiment, the three-dimensional workpiece may be protected from corrosion by conventional protection methods such as, but not limited to, electroplating, black oxide, galvanizing, or zinc phosphate.

In one embodiment, the present invention may be used to manufacture an angle-head wrench. In this embodiment, the wrench jaw has an optimized geometry calculated so that every cross section throughout the jaw beam will reach the maximum stress, meaning that there is no excess material or "over-designed" regions of the jaw. As a result, the wrench jaw has the slimmest possible geometry.

In one embodiment, the wrench jaw geometry is dictated by the following equation:

$$h(x) = \sqrt{\frac{6F}{t\sigma}x}$$

where F is the maximum force the wrench is designed to withstand, t is the wrench thickness and σ is the allowable stress. For example, if the wrench jaw beam must withstand a 9,000 N force based on a 200 N*m torque spec, the jaw is 6 mm thick, and can reach 1,200 MPa before yielding, this equation shown below will generate the slimmest profile:

$$h(x) = \sqrt{\frac{y*9000[N]}{6\ [mm]*1{,}200\ [MPa]}x} = \sqrt{7.5\ [mm]x}$$

In one embodiment, the wrench jaw has optimized internal radii. More specifically, the radii in the internal corners of the jaw opening are designed larger than competing wrenches. Sharp corners create stress concentrations with higher stresses at the corner than at other parts of the cross section. Larger radii at a corner will reduce the stress in the given corner. In the case of wrenches, a larger radius in the jaw corner will result in lower internal stress at the corner for a given torque. In one embodiment, the radius in these angle wrenches is made as large as possible in order to reduce internal stresses and increase strength. The size was constrained by hex contact. If the radius is too large, the flat portion of the wrench opening will decrease such that the flat surfaces of the hexagonal fastener will no longer be in full contact with the flats of the wrench opening. For these angle wrenches, the radius size, R, is about ⅓ the size of the wrench opening size, d, as in the equation shown below, where $C_2$ is a dimensionless constant. For this application, $C_2$ could range from about 2.5 to 3.8 while maintaining strength benefits of a large radius and still fitting a hexagonal fastener properly.

$$R = \frac{d}{C_2} = \frac{d}{3.1}$$

In one embodiment, the present invention provides an angle-head wrench in which the centerline of the wrench jaw is significantly offset from the longitudinal centerline of the handle. The offset relationship between the handle and the wrench jaw may make it easier to fit to nuts or bolts situated in tight confines. In one embodiment, the wrench jaw is maximally offset or fully offset to enhance this feature to the greatest possible degree. For example, the wrench jaw may be offset such that the outermost edge of the beam is substantially aligned or substantially flush with the corresponding edge of the handle. In a typical application of this feature, the wrench jaw and the handle may be offset such that the longitudinal edge of the handle is essentially tangent to the curved-outermost edge of the beam.

The present invention provides an improved process to make a wrench or other hand tool used to apply force to fasteners that provides at least the strength, durability, and functionality of traditional forged wrenches, except using rolled steel (of various possible alloys) that is cut by a laser and machined to finish its form (regardless of order, whether laser cut first and then 3D machined, or 3D machined first and then laser cut). The process allows for easy design changes/iterations and is cost competitive to forging, but without expensive initial tooling costs. The absence of large tooling costs allows for quick and cheap design iteration and improvement. At very high volumes, the process can be automated with modular production cells, maintaining design freedom and competitive costs relative to forging.

The present invention also allows the manufacture of tool shapes that would be excessively expensive or difficult using conventional forging techniques. For example, the present invention is well-suited for use in manufacturing angle-head wrenches, including angle-head wrenches in which the wrench jaw is both angled and offset from the centerline of the handle. As a result, the present invention can be used to produce wrenches and other tools that are designed with shapes that are optimized without being subject to the limitations of conventional forging techniques.

These and other objects, advantages, and features of the invention will be more fully understood and appreciated by reference to the description of the current embodiment and the drawings.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and is capable of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components. Any reference to claim elements as "at least one of X, Y and Z" is meant to include any one of X, Y or Z individually, and any combination of X, Y and Z, for example, X, Y, Z; X, Y; X, Z; and Y, Z.

BRIEF DESCRIPTION OF THE DRAWINGS

FIG. 3 is a perspective view of an angle wrench manufactured in accordance with an embodiment of the present invention.

FIG. 4 is a perspective view of a flat stock suitable for use in connection with the present invention.

FIG. 5 is a perspective view of a wrench blank laser cut from the flat stock.

DESCRIPTION OF THE CURRENT EMBODIMENT

Overview

Figure 2:
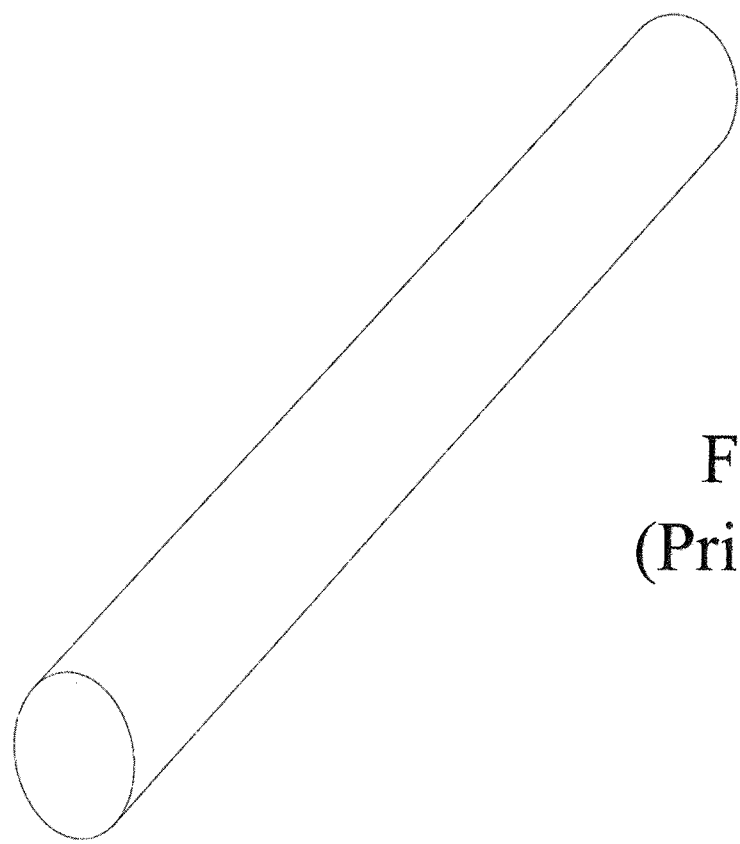
FIG. 2 is a perspective view of a conventional bar stock used to forge a wrench in accordance with the prior art.

The present invention is directed to a method for manufacturing hand tools. In the illustrated embodiment, the method includes the general steps of providing a flat stock 100, such as sheet or plate stock, having a thickness that is at least equal to the maximum thickness of the tool; laser cutting the sheet or plate stock 100 to form a tool blank 12 by cutting the general two-dimensional shape of the tool; and three-dimensionally shaping the tool blank 12 into a three-dimensional workpiece 10 using one or more machining operations that give the tool blank the desired three-dimensional shape. After laser-cutting, the method may include supplemental sanding and/or grinding steps that remove any irregularities resulting from the laser cutting process and help to provide the tool blank 12 or three-dimensional workpiece 10 with desired final shape and surface quality. The method may also include the step of heat treating the tool blank 12 or three-dimensional workpiece 10 to provide the desired material properties. In the illustrated embodiment, the method includes a quench and tempering process. Additionally, the method may include the step of applying a surface protection to the three-dimensional workpiece 10. In the illustrated embodiment, the step of applying a surface protection may include the step of electroplating, applying black oxide coating, galvanizing or applying a zinc phosphate coating.

The present invention is well-suited for use in manufacturing a wide range of hand tools, but is particularly well-suited for use in manufacturing wrenches and even more particularly angle wrenches (or angle-head wrenches), and, in that context, provides significant advantages over the conventional forging processes that have long been used to manufacture wrenches. For the purposes of disclosure, the present invention is described in the context of an angle wrench (or angle-head wrench). It should be understood, however, that the present invention is not limited to the manufacture of wrenches, except to the extent expressly set forth, and may instead be readily adapted for use in manufacturing other hand tools.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s). Further, in one aspect, the present invention is described in the context of a series of method steps. It should be noted that the order in which the steps are performed may vary from application to application, and that the present invention should not be limited to implementation of the method steps in a specific order unless to the extent expressly and unambiguously set forth in the claims.

Manufacturing Process

As noted above, the present invention is directed to the manufacture of hand tools, including without limitation to a wide range of hand tools that have conventionally been manufactured using forging techniques and apparatus. It has been determined that, despite long-held belief, a manufacturing process involving laser cutting and three-dimensional machining can provide hand tools that are at least as strong and durable as hand tools manufactured through forging. For purposes of disclosure, the present invention will be described in connection with the manufacture of an angle-head wrench, such as angle-head wrench of FIG. 3, but as noted above, may be used to manufacture a wide range of hand tools.

The present invention may be used to manufacture hand tools from a wide range of materials depending on the desired material properties of the finished hand tool. In the illustrated embodiment, the wrench 10 may be manufactured from steel plate in the form of flat stock, such as sheet stock or plate stock 100 (See FIG. 4). The sheet or plate stock 100 in this embodiment has a thickness that is essentially equal to the desired maximum thickness of the finished hand tool. With respect to the illustrated wrench 10, the sheet or plate stock has a thickness that is equal to the desired thickness of the wrench jaws 16 and 18. This eliminates the need to remove material from the sheet or plate stock at its thickest point(s), and therefore provides enhanced efficiency in material usage and reduced machining operations.

In this embodiment, the steel first exists in a block which is much thicker than its final thickness. The steel is heated above its recrystallization temperature, above 900° C., then rolled sequentially thinner and thinner. Once it reaches its final dimensions, it cools to ambient temperature. During the process, the high temperature surface oxidizes and creates a layer of scale, which in this embodiment is removed. The flat stock is then annealed in order to soften it for machining.

The repetitive compressive forces from the rolling process will help to remove voids and pores from the steel that could have formed when the metal was poured. Similar to forging, this will result in a tougher, more consistent part than alternative forming methods, which can leave voids or pores (such as casting or powder metal).

The hot rolling process causes the body centered cubic crystal structure of the iron to statistically favor a certain orientation within the flat stock. Because the crystals themselves are more/less stiff in certain directions, the resulting flat stock is stiffer in its length and width directions and less stiff in its thickness direction. The highly elongated grain structure that results from rolling gives higher strength and ductility in the elongated direction at the cost of lower strength and ductility in perpendicular directions. In addition, stress and heat from the rolling process reduces grain size which increases strength of the material. This all is beneficial because most loading of the wrench will create stresses in the length and width directions.

The method and manner of providing the flat stock 100 may vary from application to application. For example, the flat stock could alternatively be cold rolled, however this process will be more expensive due to increased energy and processing required to roll the steel at lower, more controlled temperatures.

Although the material properties of the flat stock may vary, the type of steel used should meet or exceed the hardenability, machinability, strength, and ductility parameters suitable for the hand tool being manufactured. In some applications involving the manufacture of wrenches that have comparable strength to a forged wrench, the material properties of the flat stock may meet or exceed the following parameters:

a. Hardenability—The hardenability range of the steel is relevant to allowing the metal to be soft and machineable during manufacturing but very hard and strong once finished. The material should, in some applications, be able to reach hardness values of 25 HRC or less when annealed, and 40 or higher when quenched and tempered. The lower end of the hardness range permits machining by mill with less chatter, heat, and tool wear. It also allows the part to much more easily be finished by polishing, buffing, and/or abrasive media. The high hardness correlates to a high tensile strength, but also allows the part to transfer high torque loads without permanently deforming at its contact surfaces.

b. Machinability—The steel may have a machinability of at least 40-50% relative to AISI 1112 carbon steel. This is helpful in that the part can be effectively milled, in terms of speed, cut quality, and tool wear. A low steel machinability will reduce speed and cut quality while increasing tool wear. Although a low steel machinability part can still be formed by this process, the cutting will become less economical and effective.

c. Toughness—The material may have a high toughness, combining yield and tensile strength with ductility as described in the following paragraphs:
  i. Strength—The steel may attain a yield strength of at least 1000 MPa and a Tensile strength of 1100 MPa after heat treatment and when the part is in its finished state. This is beneficial when the part is transferring high torques and therefore has high internal stresses.
  ii. Ductility—The part should, in some applications, bend before fracturing during use. Therefore, it may have an elongation at break of at least 10%.

In order to improve the speed and quality of laser cutting and hand and vibration polishing processes, the steel may (but does not have to) undergo a pickle then oil process. The pickle process consists of a series of cleaning and acid baths which remove the oxidation scale from the steel. It then passes through an oil bath in order to preserve the cleaned surface from further oxidation. The oil bath provides the steel with a coating of oil that helps to prevent rust. While this may be achieved with a variety of different oils, it may also involve alternative substances that can help to protect against rust. For example, the process may use long lasting oils or other substances that last only a few days and can be rinsed easily with water. The pickle and oil is an optional step. If the steel is cold rolled, the benefits of pickle and oil are significantly reduced because the cold rolling process does not produce as much surface scale as the hot rolling process and begins much cleaner.

The part is then "blank" cut to its general 2D shape using a laser with sufficient power, likely at least 3 kW power for a typical wrench. FIG. 4 shows a flat stock 100 after the 2D blank 12 has been cut from the flat stock 100. An oxygen, nitrogen, oxygen-nitrogen combination, or ambient air assist gas is beneficial to create an exothermic reaction, releasing energy to aid the laser cut. In one embodiment, the laser cutting step is implemented using a fiber laser, but similar results may be achievable with other laser technology. The Mitsubishi ML3015eX-F fiber laser is well-suited for use in manufacture of the illustrated wrench 10. In the illustrated embodiment, the wrench 10 is an angle-head wrench. In the illustrated embodiment, the 2D shape is cut with the laser beam extending substantially perpendicularly to the plane of the flat stock 100, but the orientation of the laser beam with respect to the flat stock 100 may vary from application to application. As shown in FIG. 5, the illustrated wrench blank 12 is formed with an elongated handle 14 having a first jaw 16 extending from one end of the handle 14 and a second jaw 18 extending from the opposite end of the handle 14. The configuration of the handle 14 may vary from application to application. For example, the length and/or cross-sectional shape of the handle 14 may be varied to tailor the wrench 10 for the desired application. As shown, the illustrated wrench 10 is an open-end wrench with angled jaws 16 and 18. More specifically, the first jaw 16 is set at an angle of 30 degrees to the longitudinal extent of the handle 14 and the second jaw 18 is set at an angle of 60 degrees. Further, in the illustrated embodiment, wrench jaws 16, 18 are laterally offset (or shifted) relative to the length of the handle 14. More specifically, the centerline of each wrench jaw 16, 18 is significantly offset from the longitudinal centerline of the handle 14. As noted above, the offset relationship between the handle 14 and the wrench jaws 16, 18 may make it easier to use the wrench 10 with nuts and bolts situated in tight confines. In the illustrated embodiment, the wrench jaws 16, 18 are maximally offset or fully offset from the handle 14. For example, each wrench jaw 16, 18 may be offset such that the curved outermost edge of the beam 20 is substantially aligned or substantially flush with the corresponding linear edge of the handle 14. As perhaps best shown in FIG. 3, the wrench jaws 16, 18 and the handle 14 may be laterally offset with the longitudinal edge 15 of the handle 14 being essentially tangent to the curved-outermost edge 21 of the beam 20. In order to account for different wrench sizes, the offset can be quantified relative to the nominal jaw opening (or hex) size. For typical wrenches manufactured using the process of the present invention, the offset is about 0.835 times the nominal opening size. However, meaningful benefits may be obtained in alternative embodiments in which the offset is at least 0.75 times the nominal opening size. For example, in a typical 10 mm wrench in accordance with the present invention, the center point of the jaw opening is offset from the centerline of the handle 14 by approximately 8.35 mm. Experience has revealed that it is difficult or cost prohibitive to form a jaw that is both shifted away from the body to maximize access and at an appropriately large angle to form an optimal angle head wrench from a conventional bar stock using conventional forging techniques and apparatus. As a result, the present invention makes it possible, from a practical standpoint, to provide wrenches with a wider range of jaw orientations. This would also be true for other hand tools where the ability to produce complex shapes is limited by the practical limitations of forging. Providing the wrench 10 with jaws set at different angular offsets facilitates use of the wrench in a wider range of applications. The angular offsets of the first and second jaws 16 and 18 in the illustrated embodiment are merely exemplary and may vary from application to application. If desired, the jaws 16 and 18 may be set at different angles in alternative embodiments. In one alternative embodiment, the first jaw 16 may, for example, be angled (as in the illustrated embodiment) and the second jaw 18 may be straight (i.e. aligned with the longitudinal extent of the handle). In another alternative embodiment, the first jaw 16 and the second jaw 18 may be set at the same angular offset, but have different jaw widths. For example, the first jaw 16 may be a 10 mm jaw and the second jaw 18 may be an 11 mm jaw. In yet another alternative embodiment, the wrench may be a combination wrench in which the first jaw is an open-end jaw (as in the illustrated embodiment) and the second jaw is a box-end jaw. As can be seen, the present invention may be used to manufacture wrenches of essentially any type or style.

Figure 6:
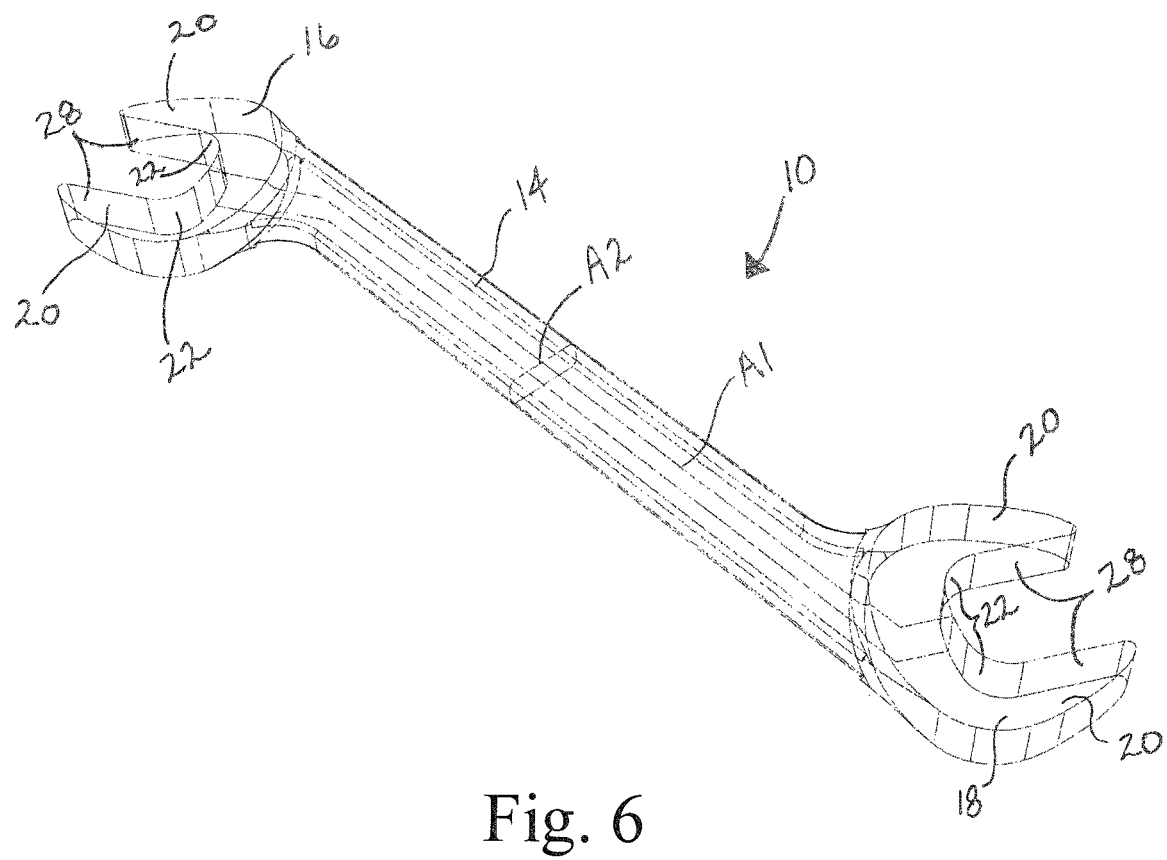
FIG. 6 is a wireframe perspective of the wrench after three-dimensional machining of the handle.

The 2D blank 12 is shaped to provide a three-dimensional workpiece 10 having the desired final three-dimensional shape. In the illustrated embodiment, the machining process includes the step or steps of removing material from the handle 14 portion of the blank 12 to bring the handle 14 to the desired three-dimensional shape. For example, as shown in the wireframe illustration of FIG. 6, the handle 14 may be thinned (See wireframe A1) and the longitudinal corners of the handle may be machined to round the generally square corners (See wireframe A2) resulting from the laser cutting process. The thinning and rounding operations give the handle 14 a somewhat oval cross section shape. In the illustrated embodiment, the handle 14 may be machined along its length to correspond in shape with a conventional forged wrench, but the size, shape and configuration of the three-dimensional handle may vary from application to application. Thinning the handle 14 may be desirable in some applications to optimize material usage for size/weight/feel and functional strength. The jaw area may receive higher stress and therefore benefit from greater thickness, while reducing the thickness of the handle may provide the wrench with weight benefits. While manufacture of the illustrated wrench 10 includes three-dimensionally shaping the handle 14, this is merely exemplary and the machining operations may be used to give essentially any desired three-dimensional shape to any and all portions of the hand tool.

In the illustrated embodiment, the two-dimensional blank 12 is machined into a three-dimensional workpiece 10 having the desired three-dimensional shape using a CNC mill or other cutting machines. In the context of a CNC mill, the mill could be 3, 4, or 5 axis, vertical or horizontal. For example, the Haas VF 3 axis CNC Mill is well-suited for use in manufacturing the illustrated wrench. Using a CNC mill allows the formation of shapes that could be difficult or impossible to achieve in a forge, like tight radii or lateral curves. The optimal type of CNC for the process is determined largely by the volume, geometry, and price of the part. Although three-dimensionally machined using a CNC mill in this embodiment, hand tools may alternatively be three-dimensionally machined using other types of cutting machines.

The 3D workpiece 10 can, but may not necessarily, be marked or branded while in the CNC machine by using the mill tool to engrave artwork designs. For example, the CNC machine may be used to label the size 26 of the wrench and/or to add a brand name 24 or other similar markings to the tool. If not marked at this stage, the wrench 10 can be separately marked in a variety of ways (stamping, etc.).

Although not shown in the illustrated embodiment, the workpiece can, in alternative embodiments, undergo a bending process as desired. For example, the workpiece can be bent during the manufacturing process to provide a jaw that extends at an angle out of the plane of the handle. Although it is possible to apply the bend at different stages of manufacture, the bending step may typically occur after laser cutting and either before or after three-dimensional machining. With wrenches that have jaws at opposite ends, the jaws may be bent out of the plane of the handle in opposite directions. The angle at which the jaw(s) is bent may vary from application to application as desired. In typical applications, this angle may be between 5 and 30 degrees.

In the illustrated embodiment, the three-dimensional workpiece 10 next undergoes any desired surface treatment steps. For example, the surfaces of the workpiece 10 may be deburred/finished using conventional finishing methods such as, but not limited to, polishing, buffing, vibration polishing, electropolishing, shot blasting or shot peening.

Once the workpiece 10 is in its final shape and surface finish, it may be heat treated. In this embodiment, the workpiece 10 is heat treated by a quench and temper process. The part is heated to above its eutectic point at ~730° C. to about ~850° C. It is then quickly cooled using an oil quench. Alternatively, a water quench could be used. The part is then reheated below its eutectic point to about 450° C. to achieve desirable hardness. The tempering temperature could range from about 300° C. to 550° C. while still achieving desirable material properties. The described heat treatment is merely exemplary and alternative heat treatment processes may be employed. For example, the 3D workpiece 10 could alternatively be hardened using an austempering heat treat process. As another example, the 2D blank 12 and/or the 3D workpiece 10 could be heat treated before machining and/or surface finishing, although this could be more difficult and expensive.

The 3D workpiece 10 then may be protected from corrosion by conventional protection methods such as, but not limited to, electroplating, black oxide, galvanizing or zinc phosphate. The corrosion protection may be applied using essentially any conventional techniques and apparatus.

Figure 7:
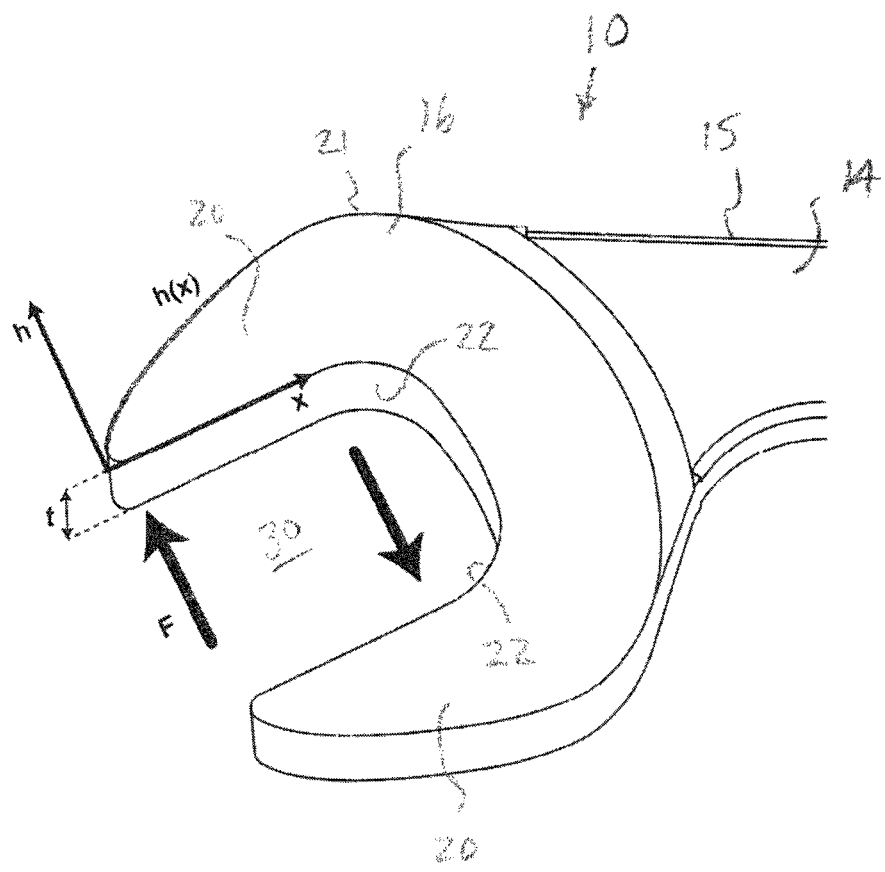
FIG. 7 is an enlarged perspective view of the jaw portion of the wrench.

In another aspect, the present invention provides improved wrench geometry that is optimized for strength and material usage. In order to design a strong wrench 10, the present invention provides an equation for the geometry of the wrench jaws, and more particularly for the height of the beams 20 of each jaw 16 and 18. The equation is derived from an understanding of how strength is evaluated and how to simply model the scenario of a wrench turning a bolt. As described in more detail below, the equation provides the geometry of the wrench jaw opening in order to optimize torque strength with material usage and space. The final equation for the wrench geometry is shown in Equation 5 below. To derive the equation, the wrench jaw was treated as a cantilever beam fixed at one end and loaded normal to its length at the other end. As shown in FIG. 7, the jaw 16 includes a pair of spaced-apart beams 20. In this embodiment, the beams 20 are symmetrical, and the equation provides the height, h, of each beam 20. Stress throughout the beam 20 can be approximated by Equation 1 below where σ is internal stress (MPa), M is moment (N*m), y is distance from neutral axis (mm), and I is the beam cross section's second moment of area (mm$^4$). Equation 1 is the equation from which all successive equations were derived.

$$\sigma = \frac{My}{I} \qquad (\text{Eq. 1})$$

This simple equation can be expanded to represent an ideal geometry for the wrench jaw "beam" through an h(x) equation, where h is height from the jaw opening plane (beam height) at x, the distance along the jaw opening plane (beam length), measuring from the tip where force is applied. Moment (M) is the cross product of force applied at the jaw (F) and the distance from the force application (x). Distance from neutral axis can be substituted for h/2 assuming the neutral axis is halfway between the jaw opening plane and height from the jaw opening. For a rectangular beam cross section, I=(1/12)*th$^3$, where t is the thickness of the wrench jaw. Substituting and simplifying all of this is shown below in Equation 2, a modified version of Equation 1.

$$\sigma = \frac{My}{I} = \frac{Fxh/2}{1/12 th^3} = \frac{6Fx}{th^2} \qquad (\text{Eq. 2})$$

Rearranging Equation 2 gives the geometry of the wrench jaw, h(x), in Equation 3 below.

$$h(x) = \sqrt{\frac{6F}{t\sigma}x} \qquad (\text{Eq. 3})$$

This geometric equation is then determined by the force, F, wrench thickness, t, and allowable stress, σ. For example, if the wrench jaw beam must withstand a 9,000 N force based on a 200 N*m torque spec, the jaw is 6 mm thick, and can reach 1,200 MPa before yielding, this equation will generate the slimmest profile, shown in Equation 4 below.

$$h(x) = \sqrt{\frac{y*9000[N]}{6\ [mm]*1,200\ [MPa]}x} = \sqrt{7.5\ [mm]x} \qquad \text{(Eq. 4.)}$$

Every cross section throughout the jaw beam will reach the specified maximum stress, meaning that there is no excess material or "over-designed" regions of the jaw. This geometry is shown in the diagram below. The equation can be applied to optimize material usage and maintain strength on nearly any open end wrench jaw that is used to turn fasteners. When solved for a specific wrench, the equation can be simplified with a constant, $C_1$, representing the F, t, and σ as in Equation 5 below. In one embodiment including 6 mm, 19 mm and 38 mm wrenches, specific constants were calculated using the variables F, t, and σ. It should be noted that the computed constants were modified slightly for use, in order to scale proportionally for all wrench sizes. For this application, a stress, σ, of 1,200 MPa was used in determining the constant for all three wrench sizes. The thickness, t, for the smallest wrench size was predetermined and increased linearly with wrench size based on fastener/fitting contact area and accessibility. For each wrench size, the force at the jaw, F, was calculated based on the forces resulting from loading the wrench to ANSI proof torque. For the smallest (6 mm) wrench, F=1,136 N, t=4.35 mm, giving constant C1 of 1.31 mm. The constant was adjusted to 1.69 for this size. For a medium (19 mm) wrench, F=9,022 N, t=7.34 mm, giving constant C1 of 6.14 mm. The constant was adjusted to 5.34 for this size. Finally, for the larger (38 mm) wrench, F=23,440 N, t=11.71 mm, giving constant $C_1$ of 10.01 mm. The constant for the larger wrench was adjusted to 10.69. So, for this exemplary set of wrenches, each unique angle wrench size may have a different constant, $C_1$, ranging from 1.69 mm to 10.69 mm. For most common wrench applications, $C_1$ will fall between 0.5 mm and 50 mm.

$$h(x) = \sqrt{\frac{6F}{t\sigma}x} = \sqrt{C_1 x} \qquad \text{(Eq. 5)}$$

In addition to providing an optimized jaw geometry, the present invention also allows for the manufacture of wrenches with optimized jaw opening 30 geometry. In this embodiment, the radii in the corners 22 of the jaw opening 30 are designed larger than conventional wrenches. Sharp corners create stress concentrations with higher stresses at the corner than at other parts of the cross section. Larger radii at corners will reduce the stress in the given corner. In the case of wrenches, such as wrench 10, a larger radius in the jaw corner 22 will result in lower internal stress at the corner 22 for a given torque.

Figure 9:
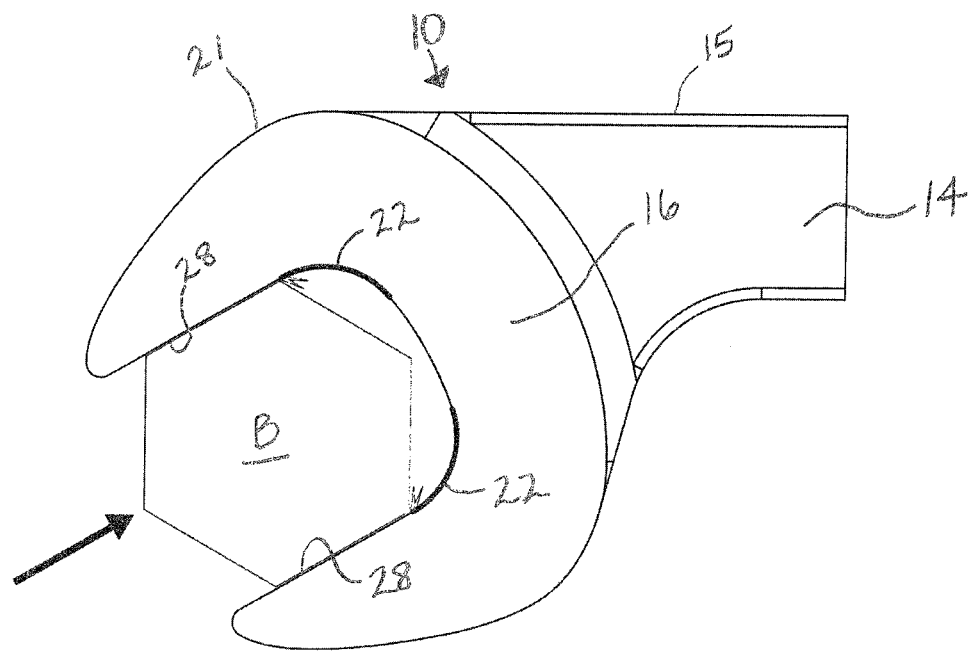
FIG. 9 is a top plan view of one jaw containing a hex head bolt.

In the illustrated embodiment, the radii of the corners 22 in the first and second jaws 16 and 18 are as large as possible in order to reduce internal stresses and increase strength. In this embodiment, the size/radii of the corners 22 is constrained by hex contact. For example, as shown in FIG. 9, the flat portions 28 of the jaw are at least of the same length as the flat sections of the bolt head B. If the radius is too large, the flat portion 28 of the wrench opening will decrease such that the hexagonal fastener will no longer adequately contact the flats 28 of the jaw opening 30.

For these angle wrenches, the radius size, R, is about ⅓ the size of the jaw opening size, d, as in Equation 6 below, where $C_2$ is a dimensionless constant. For this application, $C_2$ could range from about 2.5 to 3.8 while maintaining strength benefits of a large radius and still fitting a hexagonal fastener properly.

$$R = \frac{d}{C_2} = \frac{d}{3.1} \qquad \text{(Eq. 6)}$$

Figure 8:
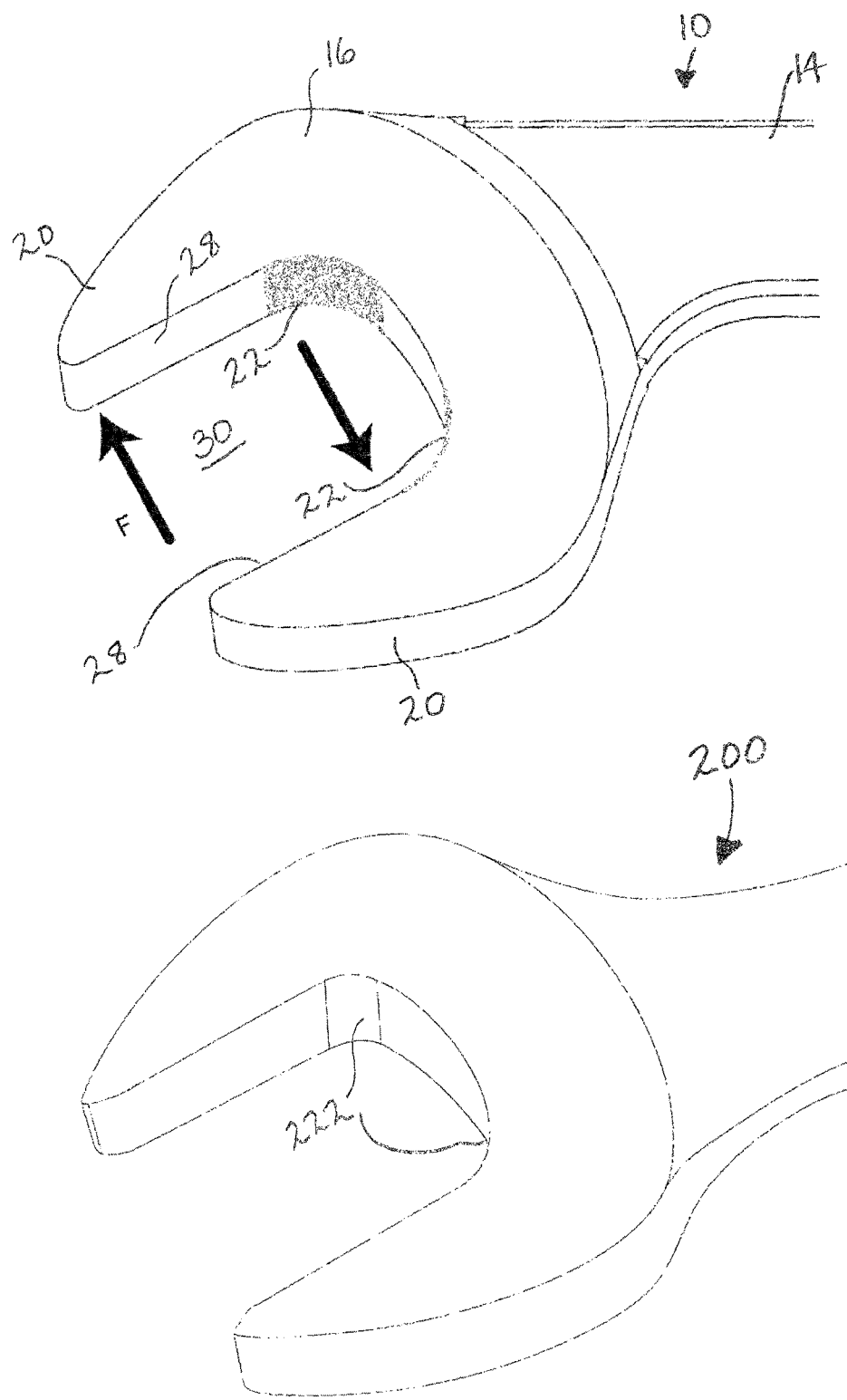
FIG. 8 is an enlarged perspective view of the jaw of the present invention compared to the jaw of a conventional forged wrench.

To illustrate, FIG. 8 compares a jaw 16 manufactured in accordance with the present invention to a combination wrench 200 that is commercially available from a well-known manufacturer/supplier of hand tools. As can be seen, the angle wrench 10 of the present invention has significantly larger radius corners 22 than the radius corners 222 of the commercially available wrench 200.

Figure 1:
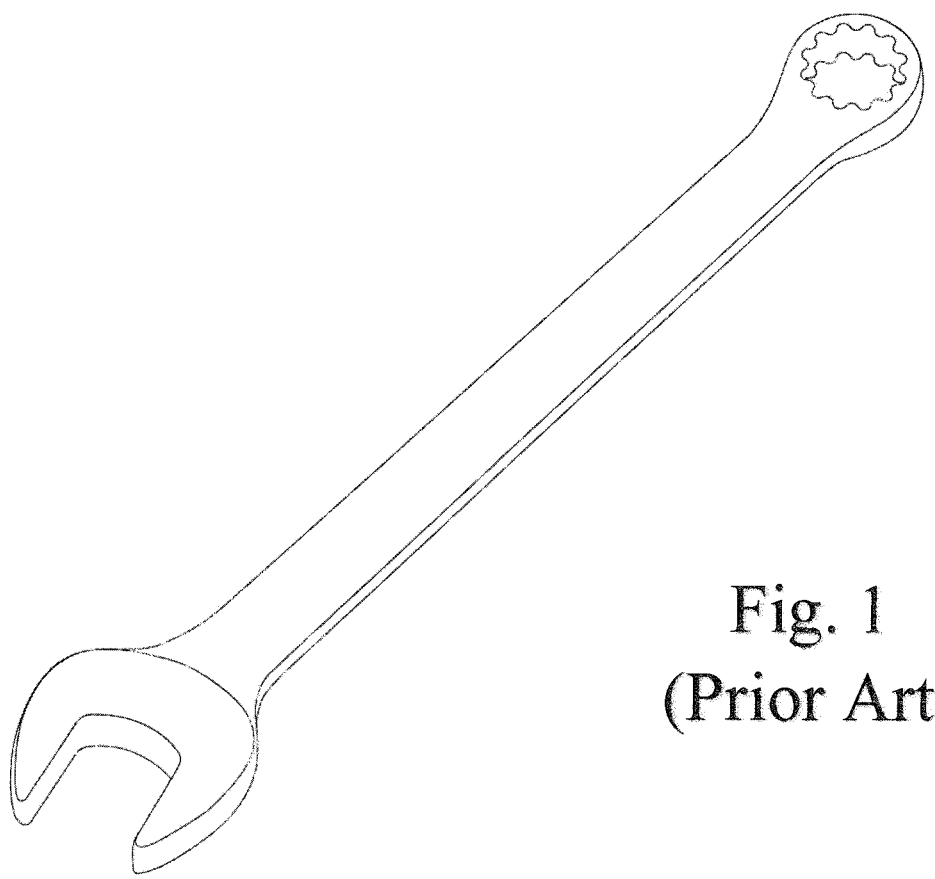
FIG. 1 is a perspective view of a conventional forged wrench in accordance with the prior art.

The laser cutting and machining process for wrench manufacture has some inherent advantages over forging in its ability to form complex or non-linear geometries. For the case of wrenches and other hand tools, the metal generally starts as a straight, cylindrical billet (See FIGS. 1 and 2). Shapes created in a forging process are limited to how far the mold can stretch or smash the metal. For example, the capital letter "T" would be very difficult to forge because it would require the straight billet to be stretched dramatically in at least one direction perpendicular from its axis. When laser cut from a plate of steel, however, a capital "T" would be very simple to form. This difference is relevant to wrenches with forms that deviate from a straight handle axis. For example, these angle wrenches have large angular and locational jaw offsets relative to the handle when compared to other common wrenches (such as combination wrenches). This shape would require the steel billet material to stretch more. This increased stretch could require higher forge temperatures, higher press forces, or multi-stage molds. These in turn could increase tool wear or even make the geometry impossible to reasonably form. On a laser machine, however, essentially any two-dimensional shape can be cut, without the laser thinking twice.

There are, however, options to bend the steel before or after forging. For example, if you were to forge an "S" shape, you could first bend the billet in two locations to form a backward "Z" shape. The "Z" billet would then be forged to form an "S". This process increases the versatility of forging, but still does not easily permit shapes like "T" to be formed.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of manufacturing a wrench having a handle and at least one jaw, comprising the steps of:
   providing a flat stock, the flat stock having a thickness equal to a maximum thickness of the jaw;
   laser-cutting the flat stock to form a wrench blank, the wrench blank forming an unfinished handle portion and an unfinished jaw portion extending from the unfinished handle portion;
   three-dimensionally machining the unfinished handle portion of the wrench blank to cut material from and reduce the maximum thickness of the unfinished handle portion of the wrench blank without reducing the maximum thickness of the unfinished jaw portion, thereby providing a three-dimensional workpiece with the unfinished handle portion having the desired three-dimensional shape and wherein the unfinished handle portion has a maximum thickness lesser than the maximum thickness of the unfinished jaw portion;
   finishing the three-dimensional workpiece; and
   heat treating the three-dimensional workpiece to arrive at the wrench, the wrench jaw having a maximum thickness equal to the thickness of the flat stock and the wrench handle having a maximum thickness lesser than the thickness of the flat stock;
   wherein the wrench jaw includes a pair of beams spaced apart to define a wrench opening with a size, each of the beams having flat hex engagement surface, each of the flat hex engagement surfaces joined to the remainder of the wrench at a separate internal corner, each internal corner having a radius of about one-third of the size of the wrench opening.

2. A method of manufacturing a wrench having a handle and at least one jaw, comprising the steps of:
   providing a flat stock, the flat stock having a thickness equal to a maximum thickness of the jaw;
   laser-cutting the flat stock to form a wrench blank, the wrench blank forming an unfinished handle portion and an unfinished jaw portion extending from the unfinished handle portion;
   three-dimensionally machining the unfinished handle portion of the wrench blank to cut material from and reduce the maximum thickness of the unfinished handle portion of the wrench blank without reducing the maximum thickness of the unfinished jaw portion, thereby providing a three-dimensional workpiece with the unfinished handle portion having the desired three-dimensional shape and wherein the unfinished handle portion has a maximum thickness lesser than the maximum thickness of the unfinished jaw portion;
   finishing the three-dimensional workpiece; and
   heat treating the three-dimensional workpiece to arrive at the wrench, the wrench jaw having a maximum thickness equal to the thickness of the flat stock and the wrench handle having a maximum thickness lesser than the thickness of the flat stock;
   wherein the wrench jaw includes a pair of beams spaced apart to define a wrench opening with a size, each of the beams having a flat hex engagement surface, each of the flat hex engagement surfaces joined to the remainder of the wrench at a separate internal corner, each internal corner having a radius equal to the size of the wrench opening divided by C, where C is in the range of about 2.5 to 3.8.

3. A method of manufacturing a wrench, comprising the steps of:
   providing a flat stock, the flat stock having a thickness substantially equal to a maximum thickness of the wrench;
   laser-cutting through the thickness of the flat stock to form the two-dimensional wrench blank having a wrench handle and at least one wrench jaw extending from the wrench handle; and
   three-dimensionally machining at least a portion of the wrench handle to cut material from the maximum thickness of the wrench handle without cutting material from the maximum thickness of the at least one wrench jaw to provide the wrench handle with a three-dimensional shape and a maximum thickness substantially lesser than the maximum thickness of the at least one wrench jaw
   wherein the at least one wrench jaw includes a pair of beams spaced apart to define a wrench opening with a size, each of the beams having a flat hex engagement surface, each of the flat hex engagement surfaces joined to the remainder of the wrench at a separate corner, each internal corner having a radius equal to the size of the wrench opening divided by C, where C is in the range of about 2.5 to 3.8.

* * * * *